W. T. FINNIGAN.
RECEIVER AND RETURN TRAP.
APPLICATION FILED MAR. 31, 1920.

1,432,021.

Patented Oct. 17, 1922.
2 SHEETS—SHEET 1.

INVENTOR
WILLIAM T. FINNIGAN,
BY
Fred J. Dieterich
ATTORNEYS

W. T. FINNIGAN.
RECEIVER AND RETURN TRAP.
APPLICATION FILED MAR. 31, 1920.

1,432,021.

Patented Oct. 17, 1922.
2 SHEETS—SHEET 2.

INVENTOR
WILLIAM T. FINNIGAN,
BY
ATTORNEYS

Patented Oct. 17, 1922.

1,432,021

UNITED STATES PATENT OFFICE.

WILLIAM T. FINNIGAN, OF PORTLAND, OREGON.

RECEIVER AND RETURN TRAP.

Application filed March 31, 1920. Serial No. 370,304.

*To all whom it may concern:*

Be it known that I, WILLIAM T. FINNIGAN, a citizen of the United States, residing at Portland, in the county of Multnomah and State of Oregon, have invented a new and Improved Receiver and Return Trap, of which the following is a specification.

This invention has reference to return traps used in connection with vapor and gravity heating plants and my said invention primarily has for its object to provide certain improvements in means of the character stated, whereby to produce a simple and inexpensive return trap for conveniently and effectively gathering the water condensations and returning the trapped fluid to the heating boiler.

Another object of my invention is to provide an improved trap of the type mentioned, in which the several parts are especially designed for first gathering the products of condensation and, when the water of condensation reaches a predetermined height to automatically close the return pipe to the trap or receiver and open the steam pressure from the boiler into the trap or receiver against the products of condensation, for driving the latter back into the boiler and, at the same time, setting into action devices that operate to cut off the steam supply to the condensation tank or chamber.

With the above and other objects in view that will be hereinafter explained, my invention comprehends an improved return trap for heating systems that embodies a peculiar construction and novel combination of parts, positive and entirely automatic in action and which will be first explained in detail, then specifically pointed out in the appended claims and illustrated in the accompanying drawings, in which:

Figure 2 is a detail vertical longitudinal section of my improved trap, the main and supplemental floats being shown in position for shifting the steam control or check valve to the open position; the locking detent for holding the valve being shown as interlocked with the valve lifting piston member hereinafter specifically referred to.

Figure 1:
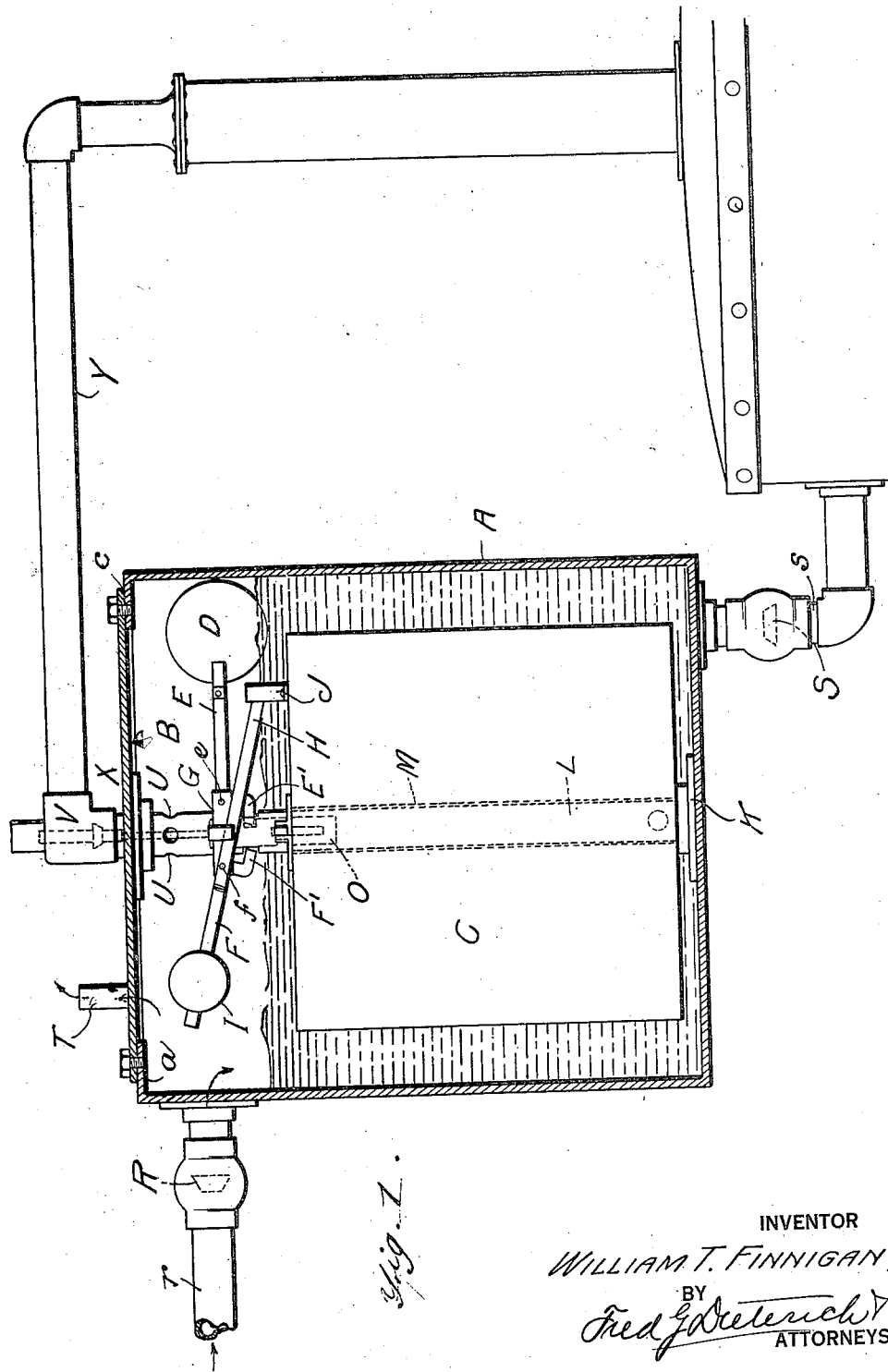
Figure 1 is a side elevation of my improved construction of return trap, the facing side of the trap tank or receiver being broken away to the better illustrate the operative parts, the latter being shown in a neutral or normal position, the location of the trap relative to the boiler being also indicated.

In the practical development of my inventon, the trap or receiver is made in the form of a cylindrical body A, located in a plane slightly above the water line of the boiler it serves, as is indicated in Figure 1 of the drawings, so that, when the steam pressure in the trap equalizes, as hereinafter explained, the water flows from the trap back to the boiler, by gravity.

The cylindrical body A has a flanged top and is provided with a detachable cover X that is bolted to the top flange c to thereby make the trap or receiver, into which the water of condensation is received from the return r, steam tight and all the internal parts accessible.

Figure 2:
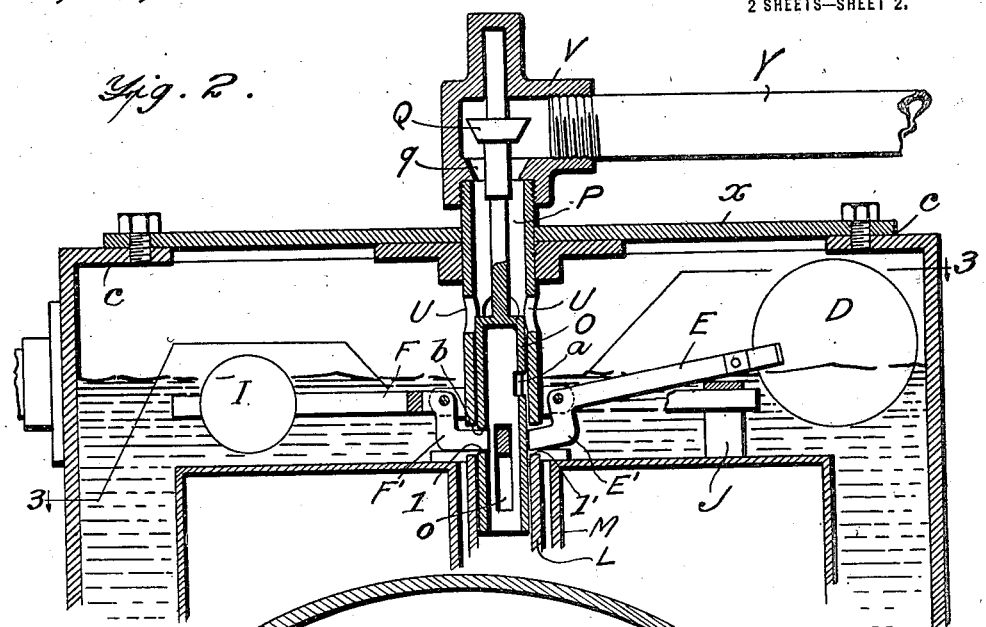
Figure 3:
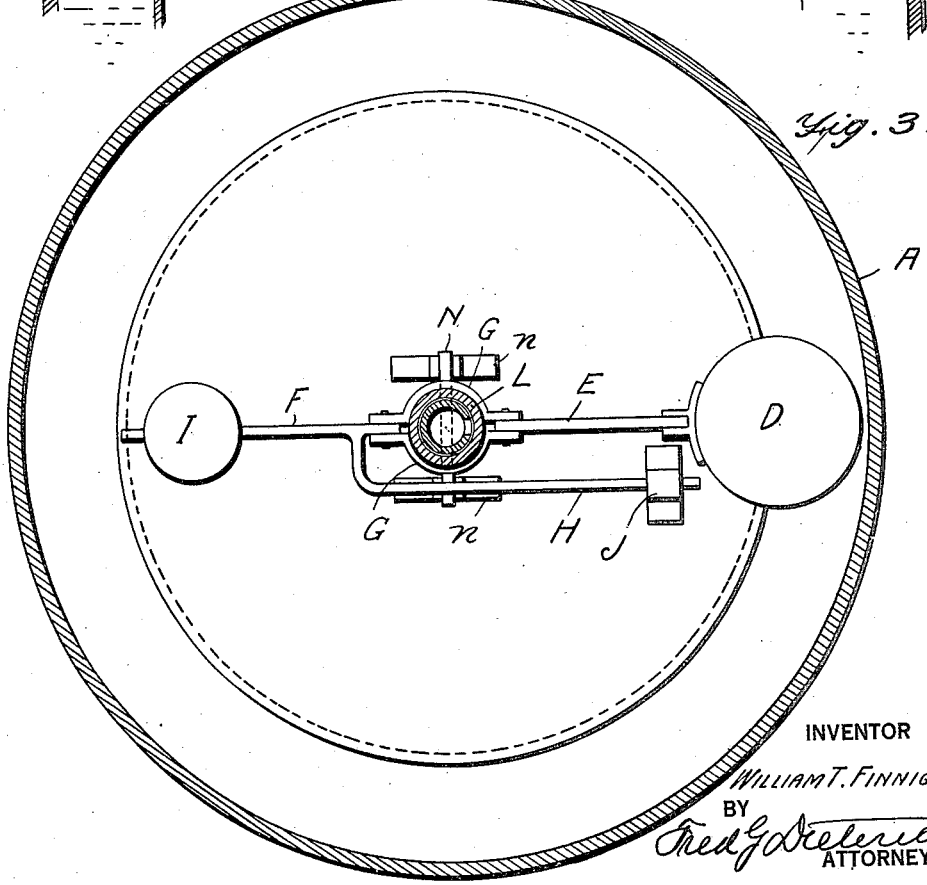
Figure 3 is a horizontal section taken substantially on the line 3—3 on Figure 2, parts being shown in plan view.

The internal working parts, the construction of which is best shown in Figure 2, include a large float C and a small float D, the latter being attached to a rocker arm E pivotally connected at e to a yoke G that is mounted on a central stand pipe L, presently further referred to.

F designates a rocker arm and it is also pivotally connected, as at f, to the yoke G. The rocker arm F carries an adjustable weight I and a forward extension H, the outer or free end of which extends through an open link J fixedly secured to the top of the large float C and which actuates the member H and its attached arm F, when the float C descends, as presently further explained.

The lower end of the stand pipe L is supported by flanges K attached to the bottom of the cylinder or bucket A and the said pipe L constitutes a guide for the large float C, when it rises and falls with the incoming and outgoing waters of condensation.

M denotes a center tube that forms a part of the large float C and it telescopically cooperates with the stand pipe L, as is best shown in Figure 2.

A pair of oppositely disposed vertical brackets n—n are mounted on top of the float C and in these brackets is mounted a cross head or pin N that connects with the large float C in the following manner:

A hollow cylindrical piston O that is formed with opposite vertically elongated slots o—o, through which the pin N passes, is mounted to move up and down within the upper end of the stand pipe L, as the large float C rises and falls.

The lower end of the piston O is open and the upper end is attached to a rod P whose upper or free end engages a pendent valve stem on a valve Q and which extends down through a steam passage $q$ in a coupling or elbow joint V, the upper part of which includes a socket-like portion $v$ in which the upper end of the valve stem is guided and moves as the piston O rises and falls.

The check valve Q, before referred to, closes onto the seat around the passage $q$, when the steam pressure is coming from the boiler through the pipe Y and when the rocker member F is at the position shown in Figure 1.

R designates a standard check valve at the discharge end of the return pipe $r$. S designates a horizontal check valve in the return line $s$ to the boiler and T indicates a standard relief valve in the top of the receiver A, as shown.

The piston O is provided with oppositely disposed apertures, an upper one $a$ and a lower one $b$ and the stand pipe L has a pair of oppositely disposed slots $l$—$l'$ through which the hook or detent ends E' and F' of the arms E and F are projected in position for interlocking with the vertically shiftable piston or valve lifting member O, as will be presently explained.

The stand pipe L is also provided with steam ports U—U through which the steam from the boiler passes into the trap or receiver A, when the valve Q is at the open or shifted position shown in Figure 2.

The manner in which my improved receiver and return trap operates is best explained as follows:

The condensation and air enters through the return $r$, after passing the check valve R. The air and the water separate in the large steam tight chamber B, the air passing out from the said chamber through the air relief valve T.

The water of condensation surrounds the large float C until it is entirely submerged and continues rising until it reaches the small float D.

The large float C is held at the submerged position shown in Figure 1 by the detents E' on the rocker arm E locking with the uppermost one $a$ of the oppositely disposed openings or sockets in the piston O.

When positioned, as stated, the submerged float C is exerting an upward pressure to the hollow piston or valve lifting member O, through the cross head N that passes through the stand pipe L and the said slotted piston O. The water still rising in chamber B partially submerges the small float D and the latter rising with the water swings the catch or detent E', on the rocker arm E, out of the notch or opening $a$ in the hollow piston O and thus instantly releases the piston (see Figure 2).

The powerful pressure on the large float caused by being submerged, drives the piston upward, its rod engaging the pendent stem of the valve Q, instantly opens the valve and thereby admitting steam from the boiler.

The rocker arm F operated by the large float C and the weight I, now comes into action, since, as the large float C jumps upwards, the link J releases the rocker arm H and its coacting member F.

The weight I causes the detent to engage with the lock notch $d$ in the piston O, as the latter is lifted through the rise of the float C and the cross head N and thus locks the piston O at the lifted and the valve Q at the open positions, as is clearly shown in Figure 2.

The steam from the boiler entering the receiver A, under pressure, through the steam ports U causes the check valve R in the return $r$ to close and the steam pressure in the receiver fills up until the boiler pressure and the pressure in the trap is equal, resulting in the water collected in the trap to flow back into the boiler by gravity, it being noted that the receiver A is set above the high water line in the boiler, as indicated in Figure 1.

As the water gradually leaves the trap, the large float C being entirely submerged, when the water starts to flow out, the said float holds its position until the greater portion of the water has left the trap, the hollow piston being held locked by the detent F', on the arm F, holds the check or steam valve open, admitting a full flow of steam and permitting the water to flow out back into the boiler freely.

When the water leaves the small float D, its weight, multiplied through the rocker arm E, holds the catch E' against the hollow piston ready for action.

When the greater portion of the water has left the trap, the large float is no longer supported and drops and, as it drops, the open link J, engages the arm H, rocks it and the arm F to the position shown in Figure 1, disengages the detent F' from the piston O and leaves the said piston free to drop back to the position shown in Figure 1 and thereby permits the incoming steam to close the check valve Q.

The small float is prepared for this movement, when the hollow piston O drops, aided by the weight of the large float C engaged through the cross bar N.

The detent E′ on the rocker arm E now engages the notch or opening a in the piston, holds the piston down and leaves the check valve Q at the closed position.

The trap is now full of steam and this is condensed in the trap by radiation and, as it condenses, a partial vacuum is obtained, causing the check valve R in the return pipe r to open and allowing water and air collected in the return to again function, as above described.

What I claim is:

1. In a return trap for heating systems, a tank having a valved controlled inlet and a valve controlled outlet for the water to and from such tank, a stand pipe that projects from the bottom through the top of the tank, a steam admission coupled to the upper end of the stand pipe, the latter having steam passages to the interior of the tank, a vertically shiftable valve for regulating the infeed of the steam to the stand pipe, a shiftable element within the stand pipe adapted under one adjustment to lift the steam controlled valve under another adjustment to permit the said valve to drop to a closure position, a float mounted around the stand pipe, operative connections between the float and the valve shifting element adapted when the float rises to shift the said element to engage and lift the valve, a latch for holding the said element to the valve lifted position, and means on the float for releasing the said latch from the valve lifting element as the said float descends.

2. In a return trap for heating systems, a tank having a valved controlled inlet and a valved controlled outlet for the water to and from such tank, a stand pipe that projects from the bottom through the top of the tank, a steam admission coupled to the upper end of the stand pipe, the latter having steam passages to the interior of the tank, a vertically shiftable valve for regulating the infeed of the steam to the stand pipe, a shiftable element within the stand pipe adapted under one adjustment to lift the steam controlled valve and under another adjustment to permit the said valve to drop to a closure position, a float mounted around the stand pipe, operative connections between the float and the valve shifting element adapted when the float rises to shift the said element to engage and lift said valve, a latch for holding the said element to the valve lifted position, means on the float for releasing the said latch as the said float descends from connection with the lifting element, and a supplemental latch device that locks the valve lifting element to the valve dropped or closure position when the float descends.

3. In a return trap for heating systems, a tank having a valved controlled inlet and a valve controlled outlet for the water to and from such tank, a stand pipe that projects from the bottom through the top of the tank, a steam admission coupled to the upper end of the stand pipe, the latter having steam passages to the interior of the tank, a vertically shiftable valve for regulating the infeed of the steam to the stand pipe, a shiftable element within the stand pipe adapted under one adjustment to lift said valve and under another adjustment to perimt the said valve to drop to a closure position, a float mounted around the stand pipe, operative connections between the float and the valve shifting element adapted when the float rises to shift the said element to engage and lift said valve, a latch for holding the said element to the valve lifted position, means on the float for releasing said latch as said float falls, a supplemental float and lever having a detent that locks the valve lifting element to the valve closed position, said supplemental float adapted to operate to release its latch after said first mentioned float has risen sufficiently to bring said operative connections into engagement.

4. In a return trap for heating systems, the combination with the condensation receiver having an inlet and an outlet; of a live steam delivery that discharges into the receiver, said delivery including a valve casing, a valve located in said casing and normally closed under steam pressure, a main float, a valve lifter adapted to be engaged by said main float and being cooperatively connected with said valve whereby when said main float rises said valve will be opened, said valve adapted to close on the falling of said float, a latch device for holding said valve in the open position, a supplemental float controlled latch member for holding said valve in the closed position and adapted to be released after said first mentioned float has risen into engagement with said valve lifter to tend to raise said valve, and means on said main float for releasing said first mentioned latch device when the float falls.

5. In a return trap for heating systems, the combination with a condensation receiver having an inlet provided with a back check valve, and a discharge; of a live steam delivery that discharges into the receiver, a valve that normally closes the steam delivery to the receiver, a device that lifts the valve to the open position at times, a float that effects the lifting of the valve when it is elevated by the water of condensation, a detent for locking the said device at the elevated or valve lifted position, the said means being cooperatively connected with the float, whereby the drop of the float effects the release of the said detent, and a supplemental detent that holds the lifting device and the float against upward movement, the said supplemental detent including a float that is shifted to release the said detent as the condensation engages it.

6. In a return trap, a receiver having a condensation inlet provided with a back check valve and an outlet, a stand pipe within the receiver that extends through the top thereof, the said pipe having steam ports opening into the receiver, a steam pipe that connects with the upper end of the stand pipe, a valve that controls the infeed through the steam pipe and the stand pipe, a lifting member vertically shiftable within the stand pipe, the said member having oppositely disposed locking notches, a main float having a central passage for fitting over the stand pipe, a pair of oppositely disposed detents pivotally sustained on the stand pipe, one of the said detents having a weight that holds it in locked engagement with one of the lock notches in the valve lifting member, the other detent having a float that normally holds it in a locked engagement with the other lock notch in the valve lifting member and releases its detent, when raised by the rising water of condensation, and a connection that joins the said lifter and the main float when the said main float moves upwardly and means on the main float for tripping the weighted detent to release it from the valve lifting member.

WILLIAM T. FINNIGAN.

Witnesses:
A. T. LEWIS,
ARTHUR H. LEWIS.